United States Patent

Pettersson

[11] 4,438,982
[45] Mar. 27, 1984

[54] GROUND-ENGAGING CONTACT ELEMENT FOR ENDLESS-TRACK VEHICLES

[75] Inventor: Helge Pettersson, Gislaved, Sweden

[73] Assignee: Gislaved Aktiebolag, Gislaved, Sweden

[21] Appl. No.: 302,417

[22] PCT Filed: Dec. 29, 1980

[86] PCT No.: PCT/SE80/00353
§ 371 Date: Sep. 9, 1981
§ 102(e) Date: Sep. 9, 1981

[87] PCT Pub. No.: WO81/01988
PCT Pub. Date: Jul. 23, 1981

[30] Foreign Application Priority Data

Jan. 11, 1980 [SE] Sweden .................. 8000257

[51] Int. Cl.³ .................................................. B62D 55/08
[52] U.S. Cl. ............................................ 305/35 EB; 305/40
[58] Field of Search ............... 305/35 R, 35 EB, 40, 305/56, 19; 152/221, 222, 223, 224, 225 R

[56] References Cited
U.S. PATENT DOCUMENTS

| 1,783,161 | 11/1930 | Stewart | 152/221 |
| 1,805,037 | 5/1931 | Burrell | 152/221 |
| 1,824,545 | 9/1931 | Hodell | 152/221 |
| 3,136,378 | 6/1964 | Patee | . |
| 3,387,896 | 6/1968 | Sobota | . |
| 3,770,039 | 11/1973 | Pfoertner | 152/221 |
| 4,262,723 | 4/1981 | de Previnquieres | 152/222 |

FOREIGN PATENT DOCUMENTS

| 185258 | 7/1955 | Austria . |
| 409101 | 3/1967 | Sweden . |
| 211490 | 7/1978 | Sweden . |

Primary Examiner—Joseph J. Rolla
Assistant Examiner—Michael S. Huppert
Attorney, Agent, or Firm—Frishauf, Holtz, Goodman & Woodward

[57] ABSTRACT

A ground-engaging contact-element for endless-track vehicles in which the tracks comprise two separate drawing-elements (3) that run in parallel over wheels. A number of the contact-elements (1) are arranged between the drawing-elements (3). Each contact-element (1) is made of flexible material so that they are flexible as well in the driving direction as in the transverse direction. The corners of each element (1) are attached to a separate link (4) in the drawing-element (3).

6 Claims, 6 Drawing Figures

GROUND-ENGAGING CONTACT ELEMENT FOR ENDLESS-TRACK VEHICLES

BACKGROUND OF THE INVENTION

The present invention relates to a new type of ground-engaging contact-element for endless-track vehicles. It is a known technique to improve the contact between a vehicle and the ground, on which it moves by providing the vehicle with bands or chains. Especially those vehicles being used in forestry, agriculture, military and other activities requiring cross-country ride, have been constructed with such bands or chains. Certain vehicles are constructed in such a way that they always are driven with bands, whereas others are provided with rubber-wheels, which—when necessary—can be equipped with bands, whereby the rubber-wheels are working inside the loop of the band. The band consists usually of two longitudinal drag-elements, as for instance drawing-chains or similar elements, between which a number of transversely flexibly fitted elements of steel or similar material run, giving ground-contact between vehicle and ground.

A factor—very essential when using bands on cross-country vehicles—is that the band must not damage the ground, either by cross-country rides, for instance when thinning forest, whereby roots from remaining and growing forest may not be damaged, or during transports on asphalted roads when the road surface may not be damaged.

The contact-elements are in all known constructions inflexible in the driving direction of the vehicle. In order to function as band-plates in driving-band for cross-country vehicles they have therefore been formed relatively short in the driving direction and flexibly connected as stiff links in the drawing-element. With such relatively short contact-elements, the ground-pressure will be concentrated to a relatively small surface, whereby ground-damages easily can arise.

It has been attempted to solve this problem by placing pressure equalizing units of elastic material between the stiff contact-elements. It is also known to let band-loops of plastic or rubber create the contact between vehicle and under-layer. Such continuous band-loops are known for instance as band for snow-vehicles and light band-waggons.

SUMMARY OF THE INVENTION

Contrary to all earlier constructions of elements for ground-contact, the present invention offers elements flexible as well in the driving direction as in the transverse direction. By building up the elements of flexible material they cannot only be bent in relation to each other, like previously known band-plates, but they can also be bent within the elements themselves. In this way each element can be made relatively long and thus offer a larger unbroken bearing-surface. In those cases, where the contact-elements are included in constructions with longitudinal chain-loops, each of these flexible elements can be applied on several between themselves flexibly connected links in the longitudinal chain-loops. Previously known stiff elements can—as mentioned above—of geometrical reasons only be fastened with one link in each connected chain.

The invention, the special characteristics of which appear in the patent claims, is best illustrated with reference to enclosed drawings.

DETAILED DESCRIPTION

Figure 1:
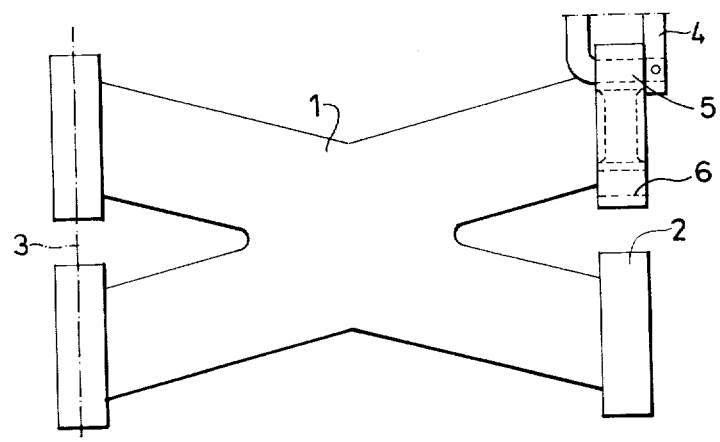
FIGS. 1, 1a and 1b show embodiments of an element for ground contact (band-plate) in plan view.
Figure 1A:
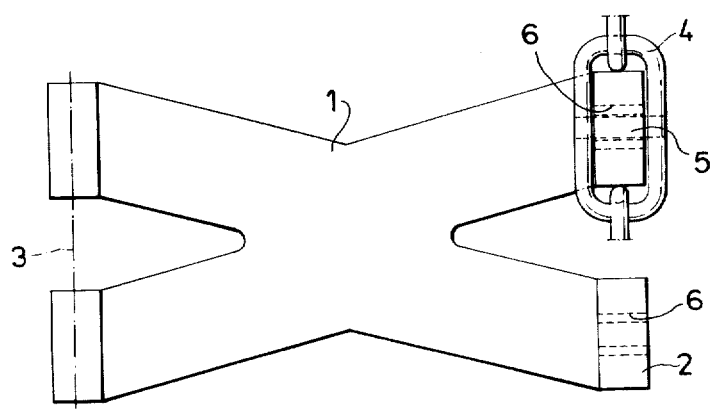
Figure 1B:
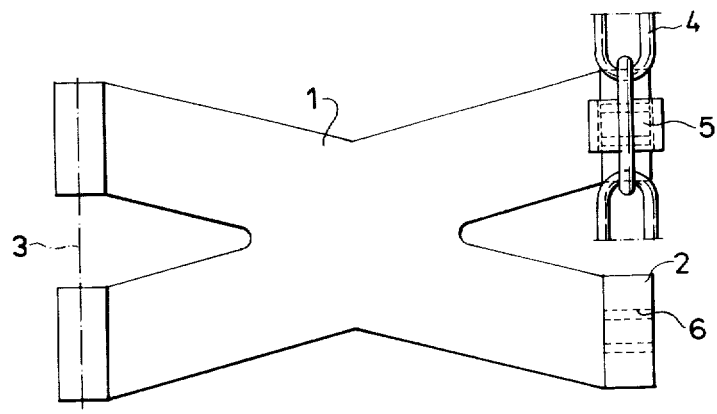
Figure 2:
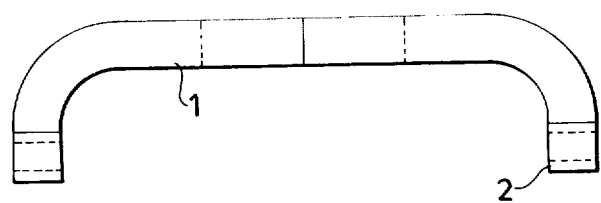
FIGS. 2, 2a and 2b show embodiments of a band-plate seen in the driving direction.
Figure 2A:
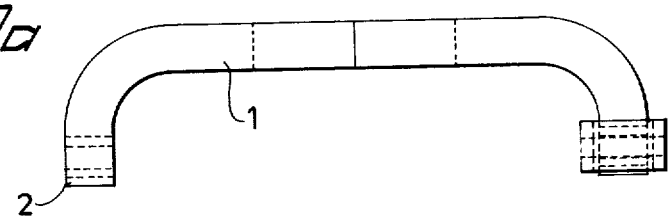
Figure 2B:
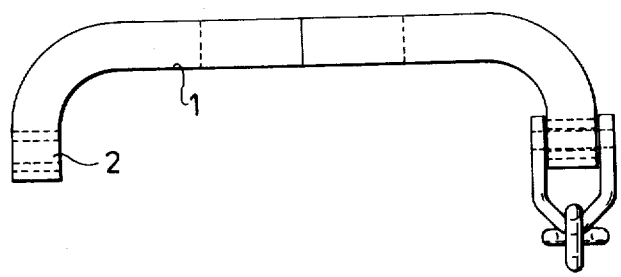

Between two parallel running drawing-elements, (i.e. chains) on the drawing marked only with the dotted line 3, band-plates (or ground-engaging contact elements) 1 are adjusted. Each of these band-plates 1 is made of elastic polymer material and formed as an X in the shown model. The corners 2 of the plate are each connected with a link 4 in the drag-element. In order to strengthen the plate it can be made with a reinforcement, not shown in the figures. The chains 3 have articulately connected links 4, some of which are releasable links which have cross members 5 which press through holes 6 in the enlarged corners 2 of the band-plates 1.

The system made possible by the newly invented contact-element offers advantages towards today's system, in the first place because the vehicles can be driven on roads and on the ground without damaging the under-layer to an unacceptable extent.

The relatively long contact-elements, made possible owing to the fact that the corners of the elements are fixed to the links of the drag-element so that they follow the curve of the bearing wheels, helps give the vehicles an even and gentle running in the country as well as on hard roads. Because the contact-surfaces are of a flexible, relatively soft material, the fire-risk, coupled with spark-ignition when steel-elements and stone-material are being rubbed against each other, is avoided. This is today a problem during summertime in the forestry, where great values and human life run a risk by forest-fire.

The new system makes it possible that vehicles provided with rubber-tires can temporarily be equipped with a band without taking off the tires. The system can thus be utilized not only for special band-vehicles.

From a maintenance point of view the new band-system has an advantage in comparison with vehicle-bands formed as a whole plastic- or rubber-band. The consumer gains economic advantages by the fact that damaged elements can be changed without rejecting or even dismounting the whole band.

The invention is not limited to the embodiment shown on the drawings but can vary within the limits of the following patent claims. Evidently the band-plate does not need to have the X-form shown on the drawing but can have a number of formations, i.e. different types of polygons. The essential thing is that the corners of the plates are each connected with separate links in the drag-elements.

I claim:

1. A ground-engaging contact element for endless-track vehicles, said endless tracks each comprising two separate drawing-elements that interconnect a plurality of contact elements and which run substantially in parallel over at least two wheels of a vehicle on each respective side of the vehicle in a driving direction, said plurality of contact elements of each track being arranged between said pair of drawing-elements to connect said pair of drawing elements with each other, each one of said drawing-elements comprising a chain having articulately connected links, at least some of said links having end points and at least some of said links comprising releasable connecting links.

said contact elements each comprising a generally polygonal plate of elastic polymer material, said plate being flexible in the driving direction of the vehicle wheels as well as in the transverse direction of the vehicle wheels; said contact elements each having a length in said driving direction which at least corresponds to the distance between endpoints of two links of said chains; and enlarged corners projecting substantially perpendicular to the main plane of said polygonal plate, said corners having through holes therein for receiving at least portions of releasable connecting links which are connectable to separate adjacent links in said chains.

2. The contact element of claim 1, wherein said through holes of said corners are substantially perpendicular to said drawing-elements.

3. The contact element of claim 1 or 2, comprising four of said corners on each contact element.

4. The contact element of claim 3, wherein said plate is generally X-shaped.

5. The contact element of claim 1 or 2, wherein said plate is generally X-shaped.

6. The contact element of claim 2, wherein said releasable connecting links have members which extend substantially perpendicular to said driving direction, said members extending in said through hole of a respective corner.

* * * * *